US006005592A

United States Patent [19]

Koizumi et al.

[11] Patent Number: 6,005,592

[45] Date of Patent: Dec. 21, 1999

[54] IMAGE PROCESSING APPARATUS HAVING IMPROVED MEMORY ACCESS FOR HIGH SPEED 3-DIMENSIONAL IMAGE PROCESSING

[75] Inventors: Tomohiro Koizumi, Yokohama; Yasuharu Takenaka, Kawasaki, both of Japan

[73] Assignee: Kabushiki KaishaToshiba, Kawasaki, Japan

[21] Appl. No.: 08/943,102

[22] Filed: Sep. 30, 1997

[30] Foreign Application Priority Data

Sep. 30, 1996 [JP] Japan .................................... 8-260030

[51] Int. Cl.$^{6}$ ............................. G06F 12/06; G06F 13/16

[52] U.S. Cl. ........................... 345/517; 345/521; 345/507

[58] Field of Search ............................ 345/418, 441–443, 345/501–503, 519–521, 507, 509, 515–517

[56] References Cited

U.S. PATENT DOCUMENTS 5,343,425 8/1994 Saito et al. .......................... 365/189.01
5,440,713 8/1995 Lin et al. ................................ 711/158
5,550,961 8/1996 Chimoto ................................. 345/433
5,815,456 9/1998 Rao .................................... 365/230.03

*Primary Examiner*—Ulka Chauhan
*Attorney, Agent, or Firm*—Oblon, Spivak, McClelland, Maier & Neustadt, P.C.

[57] ABSTRACT

An image processing apparatus suitable for three-dimensional high speed image processing can be realized by improving the memory address control and the access method, that is, by improving the data transfer speed between the image memory and the other unit. The image processing apparatus comprises the pixel forming unit (1) for forming frame data for each pixel; an image memory (2) constructed by a plurality of banks (3, 4) to which row addresses are inputted through a row address input system (6) and column addresses are inputted through a column address input system (7); and the DRAM controller (5) for controlling the image memory (2). The DRAM controller (5) controls the image memory (2) in such a way that the screen is divided into a plurality of rectangular regions so that the frame data of one rectangular region can be stored in one page of the image memory (2); the frame data in the adjoining rectangular regions are allowed to correspond to the two different banks (3, 4) of the macro cell; and the column addresses can be generated continuously when any of the banks is being accessed, so that any addresses can be accessed continuously in the same page. Further, the DRAM controller (5) controls the address sequence predicting circuit (8) in such a way that the banks to be accessed in the future can be accessed immediately after the bank to be accessed is switched.

11 Claims, 15 Drawing Sheets

IMAGE PROCESSING APPARATUS HAVING IMPROVED MEMORY ACCESS FOR HIGH SPEED 3-DIMENSIONAL IMAGE PROCESSING

BACKGROUND OF THE INVENTION

1. Field of the Invention

The present invention relates to an image processing apparatus, and more specifically to a construction of an image memory and its control system for forming picture at high speed on the basis of three-dimensional image data.

2. Description of the Prior Art

In the three-dimensional image processing apparatus, frame data (i.e., color data at each pixel) and Z value data (i.e., depth data) are generated by projecting an apex of a solid body defined in a three-dimensional space onto a screen space and by rasterizing image data on the basis of the projected apex data.

Further, these data are stored temporarily in an image memory during the arithmetic process of the image processing apparatus. In this case, the frame data and the Z value data are both stored in a prepared memory.

Now, as a method of storing the frame data, there are two methods of line buffer method and frame buffer method. In the case of the three-dimensional image processing, however, the frame buffer method is usually adopted because of its advantage that the access time is long as compared with when the line buffer method is adopted. Further, in the case of this frame buffer method, two buffers are often used. In this double buffer method, two frame buffers are prepared for storing data for one picture; that is, one frame buffer is used to display image data and the other frame buffer is used to write the same image data. When used, these two frame buffer memories are switched in accordance with the refresh rate of the picture.

In the three-dimensional image processing, in order to improve the polygon rate, that is, to increase the number of the polygons displayable in a unit time, it is necessary to increase the data transfer speed to a memory. One of the methods considered to improve the data transfer speed is to widen the bit width of the memory data bus.

When one region on a screen is allocated to a memory column, since the band width can be increased, the region to be accessed once can be widened, so that the data transfer speed can be increased and thereby the pixel rate can be improved.

In this case, however, in the vicinity of the polygon edges, there exists the case where an area other than the polygon region is included in the access region. In this case, there exists a problem in that a part of the data bus is used wastefully. To reduce this wasteful use of the data bus, it is necessary to change the region to be accessed into a flexible access region.

Conventionally, a DRAM having a burst transfer mode has been sometimes used as an image memory. When this DRAM is used in interleave method, it is possible to enable a continuous access, on condition that the banks are switched whenever a page to be accessed is switched, by RAS-activating the bank to be next accessed, simultaneously when the columns arranged in a predetermined direction in the memory are accessed continuously by burst transfer. In the conventional method, however, since the addresses for both the row system and the column system are inputted through only a single system, when non-continuous columns are accessed, there exists a problem in that the succeeding bank cannot be activated. In other words, in the case where the screen is divided into a plurality of regions and further the divided region is allocated to the column in one-to-one correspondence, although the continuous access in one predetermined direction can be made on a screen conveniently, when the continuous access is made in the other direction, the access in the other direction has inevitably an overhead.

In the conventional image processing apparatus which can execute the Z buffering, the frame data and the Z value data for each pixel are usually stored in each dedicated macro cell. In this method, however, the memory capacity used for the frame data or the Z value data is limited by the respective macro cell capacity. For instance, when one of both needs a large capacity but the other of both needs a relatively small capacity, although it is possible to use the limited memory capacity effectively by using the unnecessary and remaining memory capacity as the other memory capacity, since the memory is used dedicatedly, the above-mentioned method of using the memory capacity is strictly limited.

As described above, in the prior art image processing apparatus, since the data transfer efficiency is low in the region rear the polygon edges and further since the address input is made for each row system and each column system, there exists a problem in that the memory availability is low, because the overhead access cannot be eliminated and further the frame data and Z value data are both allocated to each dedicated memory.

SUMMARY OF THE INVENTION

With these problems in mind, therefore, it is the object of the present invention to provide an image processing apparatus suitable for three-dimensional high speed image processing, by improving the address control and the access method for the memory to increase the data transfer speed to the other unit.

To achieve the above-mentioned object, the present invention provides an image processing apparatus, comprising: data forming means (1) for forming frame data for each pixel; an image memory (2) to which row addresses and column addresses can be both inputted through different address input systems, respectively in parallel to each other, said image memory having at least one macro cell (9) composed of a plurality of banks and serving as one memory device unit for writing and reading data for itself; and control means (5) for dividing a screen (SC) on which the formed frame data are displayed into a plurality of first rectangular regions (A1) each composed of a plurality of pixels, each first rectangular region being set to such a size that all the frame data at pixels therein can be accommodated in one page of the image memory and further that the frame data of a pair of the adjoining first rectangular regions correspond to two different banks in the macro cell, respectively, said control means inputting row addresses and column addresses to the one macro cell at the same time by generating the column addresses continuously, while accessing to a bank, to enable continuous access to any predetermined addresses in the same page of the image memory, and further by previously activating the row addresses in the bank accessed thereafter so that the bank can be accessed immediately even when the accessed bank is switched from one bank to the other bank.

Further, it is preferable that said data forming means (1) forms pixel data within a polygon on the basis of polygon apex data transmitted from the outside.

Further, it is preferable that said data forming means (1) comprises: an external bus interface (25) connected to an external circuit; and a digital differential analyzer (24) for forming pixel data on the basis of data transmitted through said external bus interface (25).

Further, it is preferable that said control means (5) comprises: an address buffer circuit (29); a data buffer circuit (30); and an address pre-read circuit (28) for buffering row addresses to be accessed in the future.

Further, it is preferable that the screen (SC) is divided into a plurality of the first rectangular regions (A1); each of the first rectangular regions (A1) is further divided into a plurality of second rectangular regions (A2); and each of the second rectangular regions (A2) is composed of a predetermined number (Q) of pixels.

Further, it is preferable that said image memory (2) is composed as follows: the number of columns of one page is M columns; the number of bits of one column is N bits; the number of all the bits of one page is L (=M×N) bits; and the frame data displayed at each pixel of the screen (SC) is P bits per pixel, the screen (SC) being divided into a plurality of the first rectangular regions (A1), each of the first rectangular regions (A1) being divided into M units of the second rectangular regions (A2), and each of the second rectangular regions (A2) being composed of Q units of pixels, where Q is N/p.

Further, it is preferable that each column is divided into R units of small unit columns each composed of S bits, where R is N/S; and a data bus (DB) of said image memory (2) is divided into R units of bus blocks (BB1 to BB4) in such a way that each of the bus blocks ($BB_i$) corresponds to each of the small unit columns and thereby each of the small unit columns can be accessed independently at the same time.

Further, it is preferable that each of the second rectangular regions (A2) is divided into R units of small regions (A3) in such a way that each divided small region (A3) corresponds to each small unit column; and said control means (5) can access to a plurality of the small unit columns of corresponding different bus blocks at the same time, irrespective of the small unit columns belonging to the same column or the different columns.

Further, it is preferable that said image memory (2) has a plurality of the macro cells (9); the first rectangular regions (A1) on the screen (SC) is further divided into a plurality of second rectangular regions (A2) in one-to-one correspondence to the columns in one page; and the frame data of the two adjoining second rectangular regions (A2) on the screen (SC) are accessed by said control means (5) for each macro cell (9) separately.

Further, the present invention provides an image processing apparatus, comprising: data forming means (1) for forming frame data indicative of color data and Z-value data indicative of depth data for each pixel; an image memory (2) to which row addresses and column addresses can be both inputted through different address input systems, respectively in parallel to each other, said image memory having a plurality of macro cells (15, 16) each composed of a plurality of banks and each serving as one memory device unit for writing and reading data for itself, the frame data and the Z-value data being both accessed through a common data bus; and control means (5) for dividing a screen (SC) on which the formed frame data and the Z-value data are displayed into a plurality of rectangular regions (B1), each rectangular region (B1) being set in such a way that all the frame data and the Z-value data therein can be accommodated in one page of the image memory (2), the frame data and the Z-value data corresponding to the same rectangular region (B1) on the screen being stored in banks of different macro cells, respectively, the frame data of two adjoining rectangular regions (B1, B1) being stored in the two different banks of the same macro cell or in the two different banks of the two different macro cells, respectively, the Z-value data of two adjoining rectangular regions (B1, B1) being stored in the two different banks of the same macro cell or in the two different banks of the two different macro cells, respectively in such a relationship between the frame data and the Z-value data that the frame data of one rectangular region (B1) and the Z-value data of the other rectangular region (B1) adjoining thereto are stored in the two different banks of the same macro cell or in the two different banks of the two macro cells in such a way that the respective macro cells and the respective banks can be used uniformly.

Further, it is preferable that said data forming means (1) comprises: an external bus interface (25) connected to an external circuit; a digital differential analyzer (24) for forming pixel data on the basis of data transmitted through said external bus interface (25); a blending unit (34) for executing alpha-blending processing; and a Z comparator (33) for executing Z-buffering processing.

Further, it is preferable that said control means (5) comprises: an address buffer circuit (29); a frame buffer circuit (31); a Z buffer circuit (32); and an address preread circuit (28) for buffering row addresses to be accessed in the future.

Further, it is preferable that each of a plurality of the macro cells is composed of a plurality of banks (17, 18; 19, 20); and the data stored in the same macro cell (15 or 16) among the frame data and the Z-value data in the two adjoining rectangular regions (B1, B2) adjoining on the screen (SC) are stored in the different banks of the same macro cell.

Further, it is preferable that when said control means accesses the banks (17 to 20), the column addresses are inputted continuously so that any addresses in the same page can be accessed continuously, and further the rows of the bank to be next accessed are activated in parallel to the input of the column addresses so that the switched bank can be accessed continuously.

Further, it is preferable that said control means (5) can access the frame data and the Z-value data corresponding to the same pixel for each macro cell (15, 16) separately through one data bus alternately.

Further, it is preferable that said control means (5) accesses the frame data and the Z-value data corresponding to the same pixel at the same time for each macro cell (15, 16) separately, to write and read the frame data and the Z-value data in and from each of the different macro cells at the same time.

DETAILED DESCRIPTION OF THE PREFERRED EMBODIMENTS

Some embodiments of the image processing apparatus according to the present invention will be described hereinbelow with reference to the attached drawings.

1st Embodiment

Figure 1:
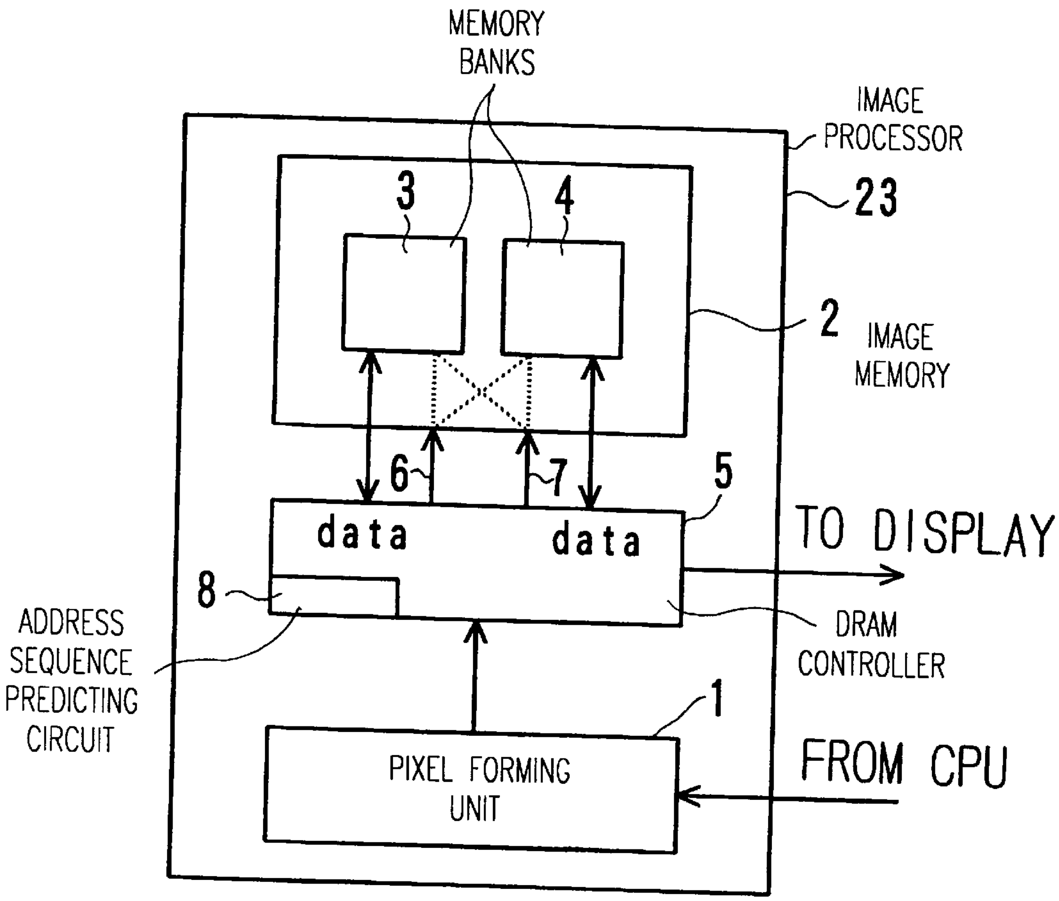
FIG. 1 is a block diagram showing a first embodiment of the image processing LSI according to the present invention.

FIG. 1 is a block diagram showing the first embodiment. In the drawing, a pixel forming unit 1 of an image processor 23 forms frame data at each pixel. An image memory 2 stores the pixel data formed by the pixel forming unit 1. In FIG. 1, one macro cell of the image memory 2 is shown, to which two banks 3 and 4 are set. A DRAM controller 5 is disposed between the pixel forming unit 1 and the image memory 2, to control the image memory 2. The DRAM controller 5 has a row address input system 6 and a column address input system 7, each to transmit the addresses and the data to the image memory 2. Here, the row address and the column address can be given to the two different banks 3 and 4 at the same time. Further, in the DRAM controller 5, the sequence of addresses used to access the image memory 2 can be predicted previously by an address sequence predicting circuit 8. The above-mentioned elements are all mounted together on a single LSI chip.

Further, control signals and image data are given from a CPU (not shown) to the pixel forming unit 1, and display signals are transmitted from the DRAM controller 5 to a display unit (not shown).

The operation of the circuit construction as described above will be described hereinbelow with reference to FIG. 2. Here, FIG. 2 is a conceptual view showing how to allocate the rectangular regions obtained by dividing a screen into first rectangular regions, to the frame banks.

Figure 2:
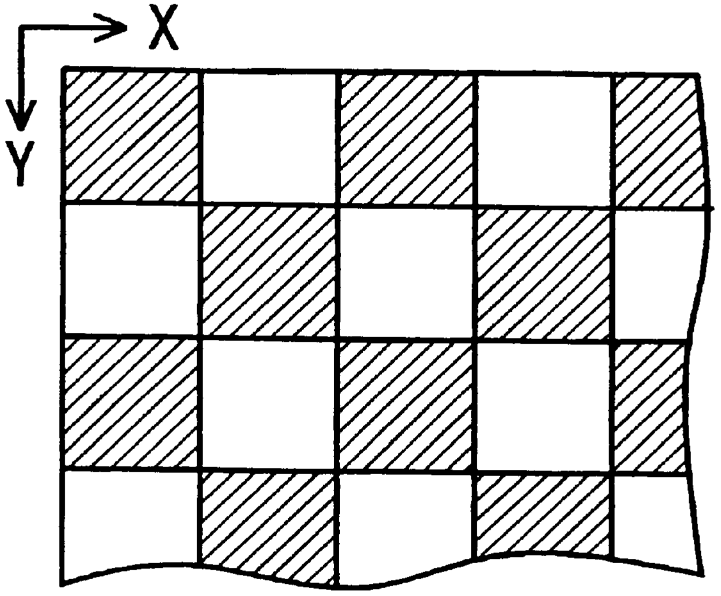
FIG. 2 is an illustration for assistance in explaining an allocation of the rectangular regions to the banks in the construction shown in FIG. 1.

The frame data formed by the pixel forming unit 1 and further displayed on a screen are divided into the first rectangular regions as shown in FIG. 2 by the DRAM controller 5. In this case, the data of rectangular regions adjoining each other are allocated to the two different banks, respectively in a chessboard pattern, as shown in FIG. 2.

In the example shown in FIG. 2, the two banks 3 and 4 of the image memory 2 are used to divide the screen into the first rectangular regions and to allocate the frame data of the rectangular regions to the banks, respectively. In this case, the regions are divided and the divided rectangular regions are allocated to the banks, respectively, in such a way that all the memory capacity of the frame data in each rectangular region is less than one page of the image memory 2.

That is, the adjoining two first rectangular regions are allocated to the two banks 3 and 4 of the image memory 2, respectively in such a way that when the column addresses and the row addresses are given separately to the screen horizontal direction (X direction) and the screen vertical direction (Y direction), respectively, any desired pixels can be accessed continuously in any desired directions.

In this first embodiment, since the systems for giving the addresses to the image memory 2 are separated into the row address input system 6 and the column address input system 7 in the DRAM controller 5, when the continuous access is executed by inputting the column addresses continuously into any desired pixels in the first rectangular regions on the same page (i.e., on the same screen), it is possible to previously know the row addresses of the two banks 3 and 4 to be next accessed, so that the row address can be activated previously. In other words, since the column address of the succeeding bank can be inputted immediately, it is possible to eliminate the overhead due to page breaks.

As described above, in the first embodiment, since the row address input system 6 and the column address input system 7 between the DRAM controller 5 and the image memory 2 are separated from each other, the restriction of access directions can be relaxed and thereby an effective access to the image memory 2 can be achieved.

2nd Embodiment

Figure 3:
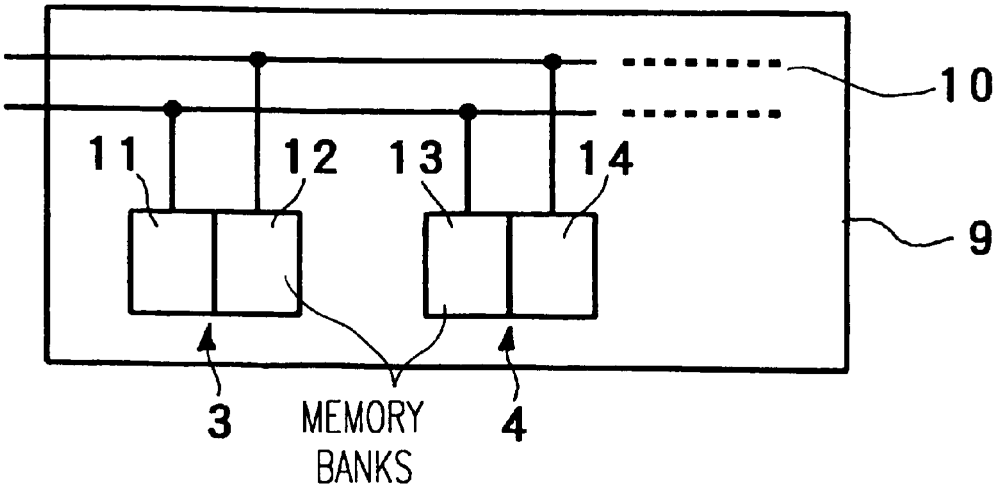
FIG. 3 is a partial block diagram showing a second embodiment of the image processing LSI according to the present invention, in which the memory is constructed by providing small units.

FIG. 3 is a partial block diagram showing the second embodiment of the image processing apparatus according to the present invention. In the drawing, the image memory 2 is constructed in such a way as to have small units to be accessed regardless of the columns. Here, a macro cell 9 is set as one unit. Further, in the macro cell 9, the two banks 3 and 4 are further divided into two small regions 11 and 12 and two small regions 13 and 14, respectively. On the other hand, although a data bus 10 is connected to the macro cell 9, the data bus 10 itself is divided into some blocks in accordance with the number of the divided banks 3 and 4. Therefore, the divided data buses correspond to the two divided small regions 11 and 12 or the two divided small regions 13 and 14 of the banks 3 and 4, respectively.

Further, the columns are divided uniformly into the number of the small regions 11 and 12 or the small regions 13 and 14 of the banks 3 and 4, and arranged separately in small unit. Therefore, even if the columns are different from each other, it is possible to simultaneously access the small units in the same page by the divided data buses 10.

Figure 4:
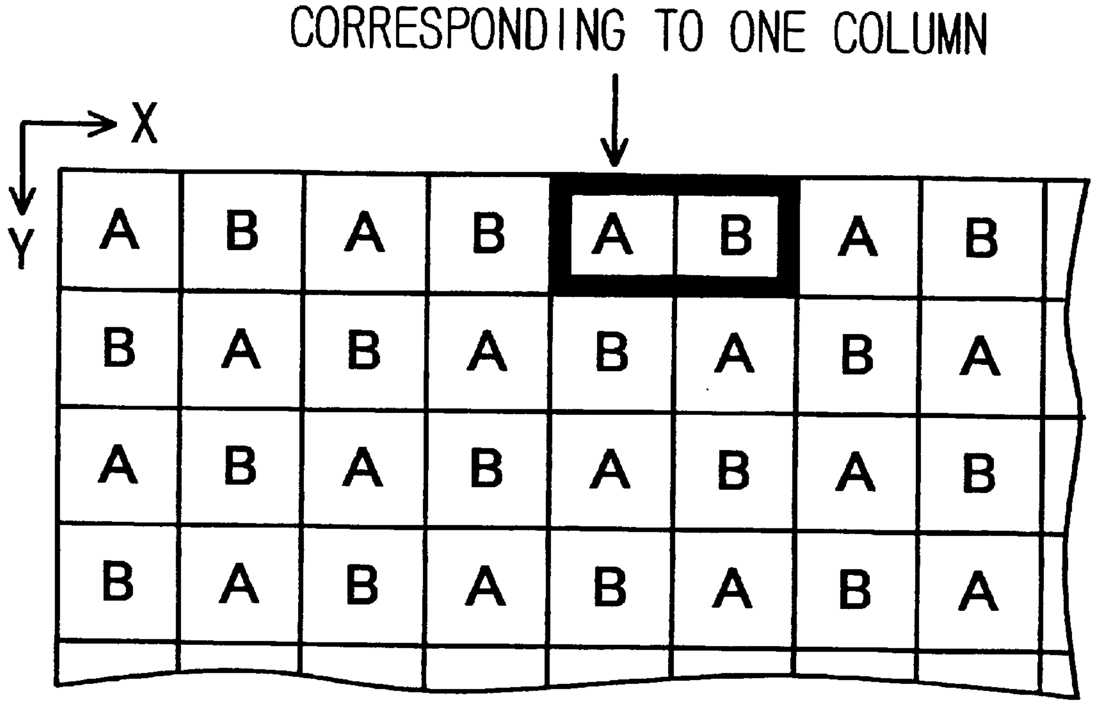
FIG. 4 is an illustration for assistance in explaining an allocation of the screen regions to the small units of the column.

FIG. 4 is an illustration for assistance in explaining the corresponding relationship among the pixels on the screen, the columns of the image memory 2, and the small units for constructing the banks 3 and 4, which is obtained when the macro cell 9 is applied to the image memory 2 shown in FIG. 1.

In FIG. 4, as enclosed by thick lines, when a region A and a region B are allocated to the small units of the column, respectively and further when a third rectangular region corresponding to the small units in the column is perfectly out of the polygon region, without accessing the region, it is possible to access the small units of the different column of the same page in such a way that the corresponding data bus 10 is the same as that of the above small unit and further the third rectangular region can be included within the polygon.

As a result, the data transfer density can be improved, so that it is possible to increase the effective data transfer speed, as compared with when the small units do not exist.

3rd Embodiment

Figure 1A:
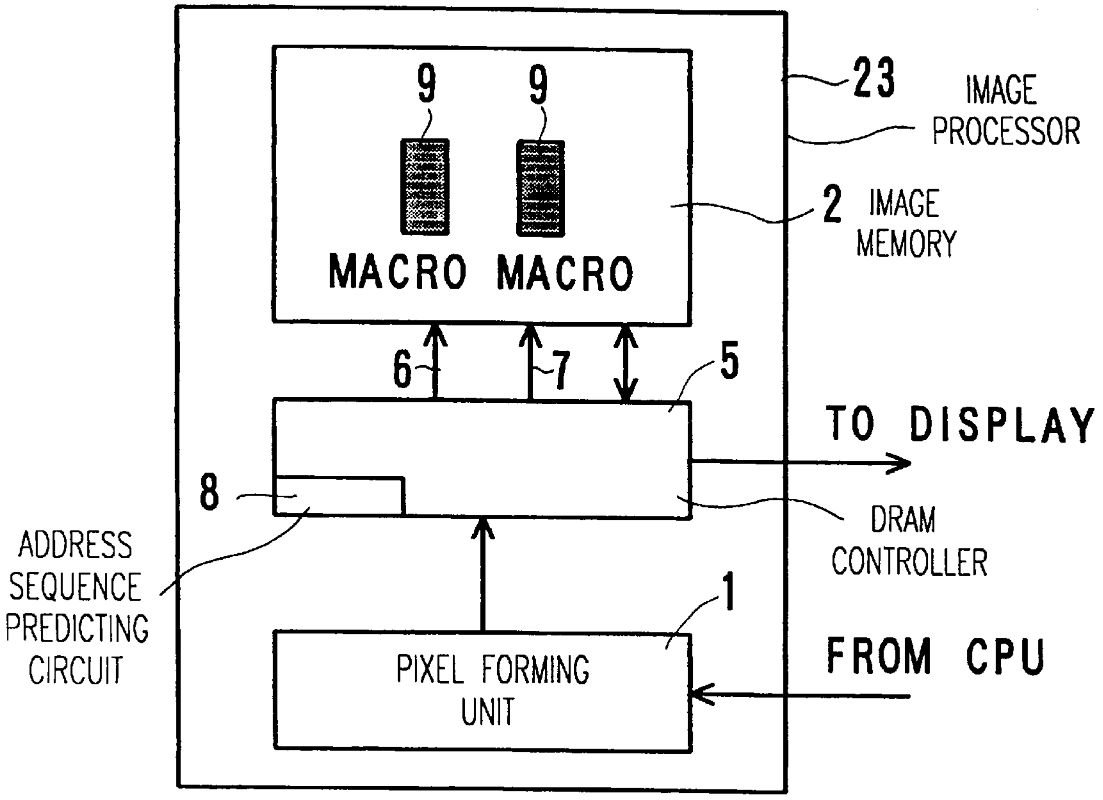
FIG. 1A is a block diagram showing a third embodiment of the image processing LSI according to the present invention, in which a plurality of macro cells are arranged.

In this third embodiment, a plurality of the macro cells 9 are arranged as shown in FIG. 1A. In other words, when the pixels on the screen are allocated to the macro cells, the first rectangular region on the screen is divided into a plurality of the second rectangular regions, and further the respective frame data of the two adjoining second rectangular regions are written in and read from the macro cells separately, in one-to-one correspondence between the divided second rectangular regions and the columns in the same page.

As a result, since the pixels processed simultaneously often adjoin to each other, when the data of the adjoining column rectangular regions are allocated to different macro cells separately, it is possible to increase the processing efficiency.

4th Embodiment

Figure 5:
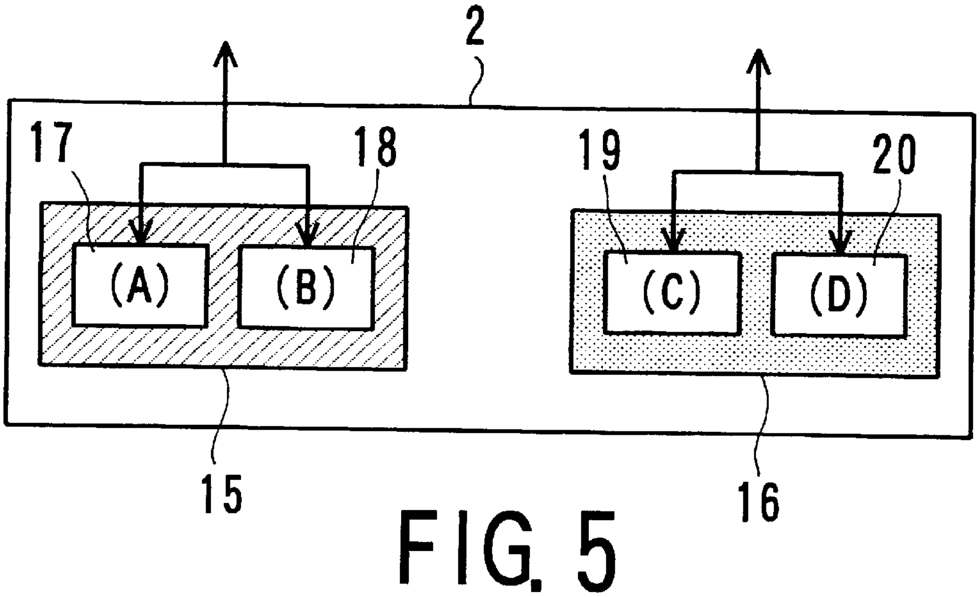
FIG. 5 is a partial block diagram showing a fourth embodiment of the image processing LSI according to the present invention, in which the frame data and the Z value data are both stored.

FIG. 5 is a partial block diagram showing the fourth embodiment of the image processing apparatus according to the present invention. In the drawing, the image processing apparatus has a system for processing frame data and another system for processing Z value data by use of two pairs of macro cells 15 and 16. The macro cell 15 is divided into a bank 17 corresponding to the region A and a bank 18 corresponding to the region B; and the macro cell 16 is divided into a bank 19 corresponding to the region C and a bank 19 corresponding to the region D.

In the above-mentioned construction, the screen is divided into rectangular regions B1 in such a way that the frame data and the Z value data can be both stored in one page of the image memory 2. Further, the data of the two adjoining rectangular regions B1 are stored in the different banks 17, 18, 19 and 20 or in the different macro cells 15 and 16, respectively. Further, the frame data and the Z value data corresponding to the same rectangular region are stored separately in the different macro cells of a pair of the macro cells 15 and 16, respectively.

Figure 6A:
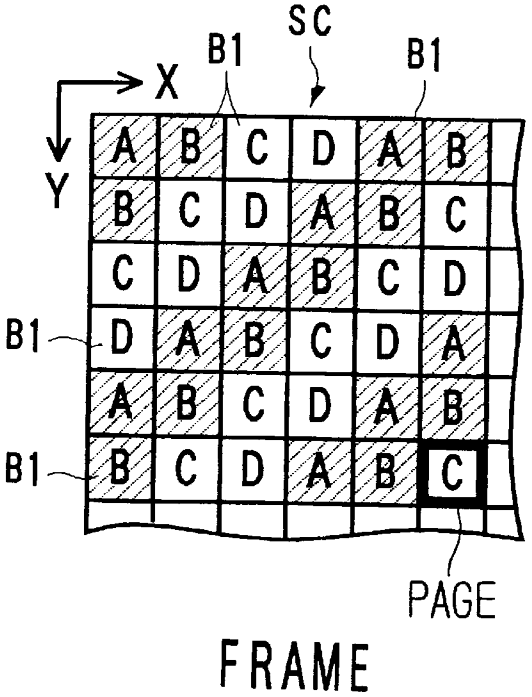
FIGS. 6(A) and 6(B) are illustrations for assistance in explaining the storage of the frame data and the Z value data in a memory, respectively.
Figure 6B:
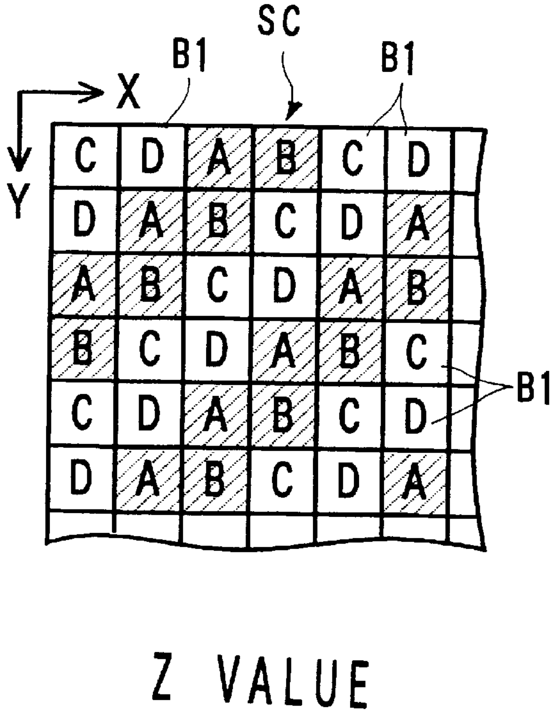

In other words, since the frame data are stored separately as shown in FIG. 6(A), and the Z value data are stored separately as shown in FIG. 6(B), it is possible to use a pair of macro cells 15 and 16 uniformly, so that the image memory 2 can be used effectively.

5th Embodiment

In the construction as shown in FIG. 1 or 5, when the banks 17, 18, 19 and 20 are accessed, the continuous access can be executed, even if the accessed banks are switched, by continuously inputting the column addresses to access any desired addresses in the same page and by simultaneously RAS-activating the banks to be next accessed. Therefore, it is possible to provide the above-mentioned function for the DRAM controller 5 and the address sequence predicting circuit 8.

In other words, since the DRAM controller 5 is provided with the row address input system 6 and the column address input system 7, the data of both the row and column systems can be inputted at the same time. Therefore, it is possible to activate the bank to be next accessed during the column input, to reduce the penalty of page breaks, so that the access efficiency of the image memory 2 can be improved.

6th Embodiment

Figure 7:
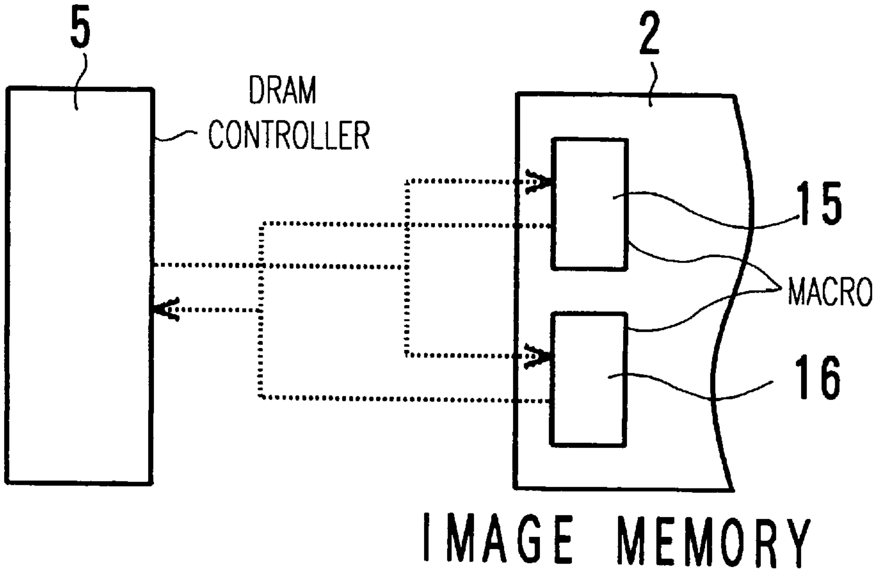
FIG. 7 is a partial block diagram showing a sixth embodiment of the image processing LSI according to the present invention, in which the frame data and the Z value data are accessed alternately.

FIG. 7 is a partial block diagram showing the sixth embodiment of the image processing apparatus according to the present invention. In the drawing, the image memory 2 is controlled by the DRAM controller 5 in such a way that the frame data and the Z value data of the same pixel are written in and read from two macro cells 15 and 16, separately and further that both the data stored in the macro cells 15 and 16 can be accessed by one data bus alternately.

In other words, when the pixels on the screen are allocated to the memory regions as shown in FIGS. 6(A) and 6(B) and then the pixel data are written in or read from the image memory 2, a pair of the macro cells 15 and 16 for storing the frame data and the Z value data corresponding to the pixel, respectively can be accessed alternately by inputting the column addresses alternately from the DRAM controller 5 to the two macro cells 15 and 16.

7th Embodiment

Figure 8:
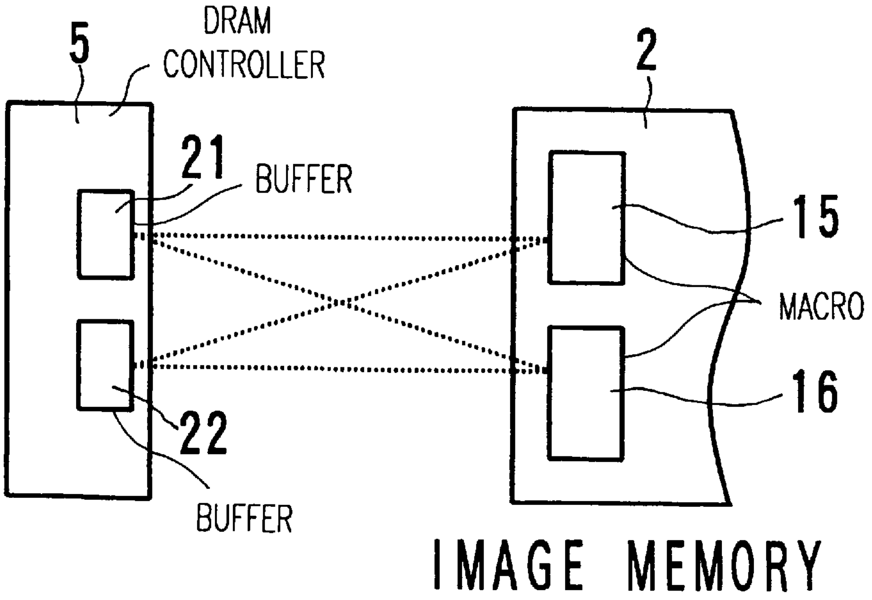
FIG. 8 is a partial block diagram showing a seventh embodiment of the image processing LSI according to the present invention, in which the frame data and the Z value data are accessed simultaneously.

FIG. 8 is a partial block diagram showing the seventh embodiment of the image processing apparatus according to the present invention.

In the construction shown in FIG. 8, the frame data and the Z value data of the same corresponding pixel are written in two macro cells 15 and 16 separately. Further, the DRAM controller 5 is provided with a function for reading these data from the macro cells 15 and 16. Therefore, the two macro cells 15 and 16 for storing the frame data and the Z value data corresponding to the same pixel can be accessed simultaneously by the data bus, so that it is possible to read and write the frame data and the Z value data of the same pixel simultaneously.

In other words, the macro cells 15 and 16 construct a pair of macro cells for storing the frame data and the Z value data of the same corresponding pixel. Further, the DRAM controller 5 is provided with a frame data buffer 21 and a Z value data buffer 22, respectively. Therefore, when accessing pixel data, the DRAM controller 5 outputs the column addresses to the macro cell 15 for storing the frame data and the macro cell 16 for storing the Z value data at the same time, so that the data can be written in and read from both the macro cells 15 and 16, respectively.

The above-mentioned embodiments will be described in further detail hereinbelow.

1st Embodiment

Figure 9:
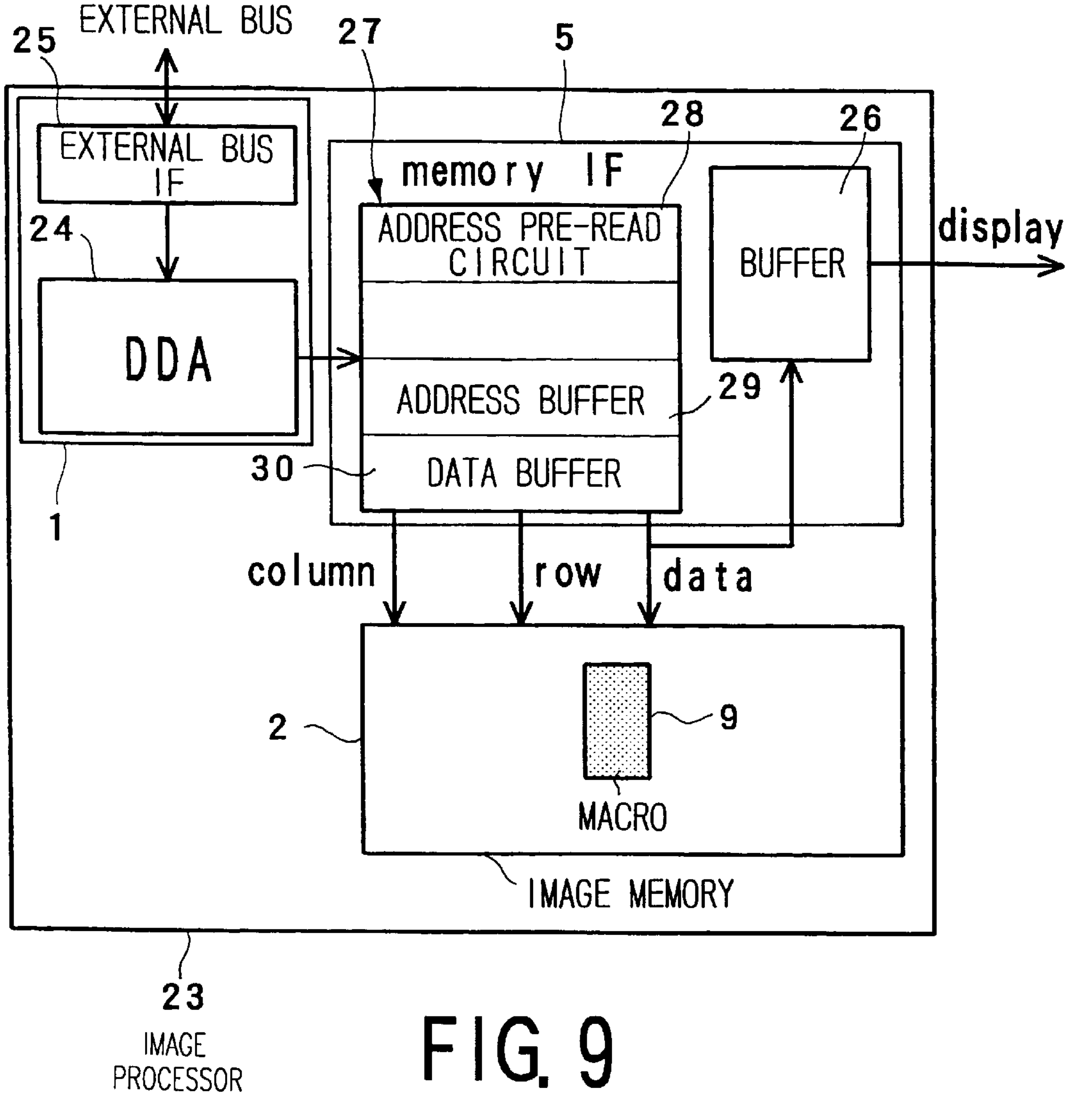
FIG. 9 is a detailed block diagram showing the first embodiment of the image processing LSI according to the present invention.

FIG. 9 is a detailed block diagram showing the first embodiment of the image processing apparatus.

In FIG. 9, the image processing apparatus 23 is composed of an external bus interface 25 connected to a CPU for forming polygon apex data through an external bus, a DDA (digital differential analyzer) 24 for forming pixel data inside a polygon on the basis of the apex data, an image memory 2 of DRAM including one macro cell 9, a memory interface 27 for controlling the image memory 2, and a buffer 26 for transmitting image data to a display unit (not shown). Here, the memory interface 27 is composed of an address buffer 29, a data buffer 30, and an address pre-reading circuit 28 for internally buffering the row addresses to be accessed in the feature. Here, the memory interface 27 can input both the addresses of the row system and the column system at the same time. Further, in FIG. 9, the memory interface 27 and the buffer 26 have the functions corresponding to those of the DRAM controller 5 shown in FIG. 1, and the DDA 24 and the external bus interface 25 correspond to the pixel forming unit 1 shown in FIG. 1.

The operation of the construction as shown in FIG. 9 will be described hereinbelow.

First, the continuous access will be considered. Here, as the construction of the image memory 2, the following conditions can be considered:

Memory data bus width: 128 bits

Number of macro cells: 1

Number of banks: 2

(each bank comprises a plurality of pages, the number of which is determined according to application)

Page size: 32 columns

Column size: 128 bits

Small unit: None

Number of pixel bits: 16 bits per pixel

Synchronous interface: Yes

Figure 10:
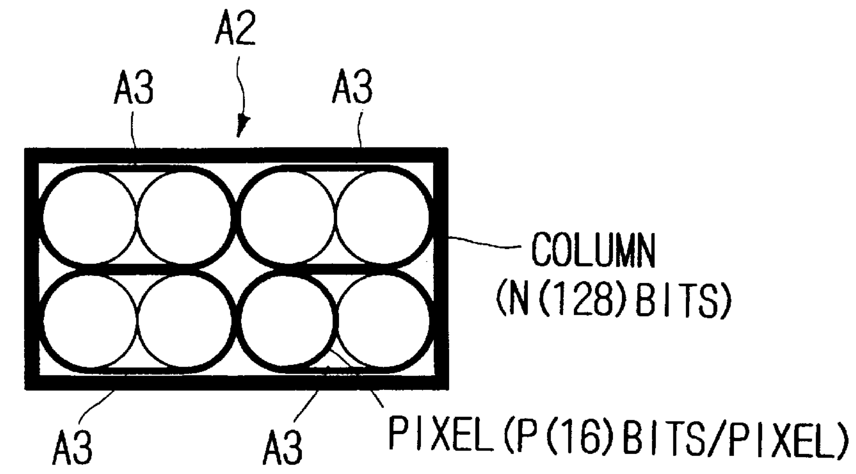
FIG. 10 is an illustration for assistance in explaining the column structure of a rectangular portion shown in FIG. 1.
Figure 11:
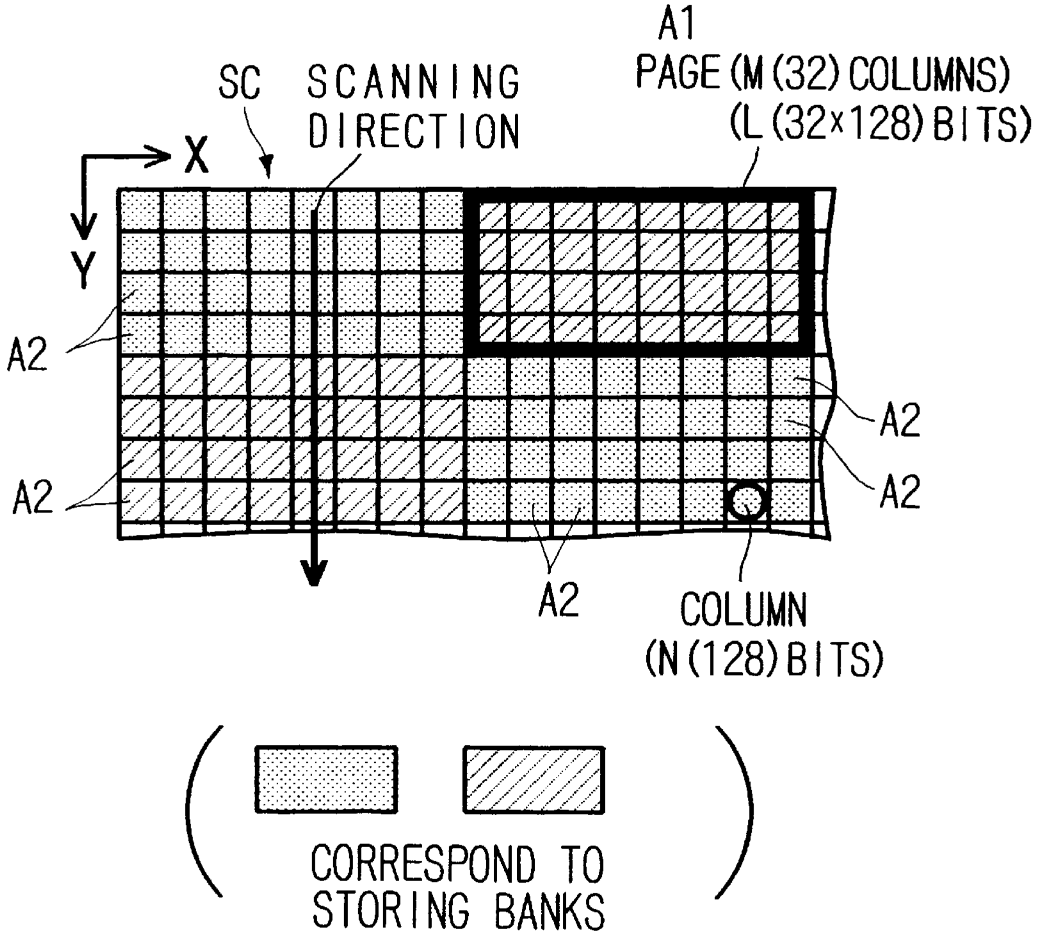
FIG. 11 is an illustration for assistance in explaining the allocation of the page and the column to the image memory in the first embodiment.

Under these conditions, data for eight pixels can be stored in one column. In this case, as shown in FIG. 10, the screen is divided into rectangular regions each composed of 4×2 column pixels, and each rectangular region is allocated to each column of the image memory 2 in one-to-one correspondence. Further, since one page of the image memory 2 is composed of 32 columns, the rectangular region shown in FIG. 10 can be allowed to correspond to one page of the image memory 21 for each 8×4 column, as shown in FIG. 11. In this case, data of the rectangular regions of the adjoining pages are stored in different banks separately, as shown by hatched regions and mesh point regions in FIG. 11.

Here, the case will be considered where the pixel data generated by the DDA 24 in the arrow direction (i.e., Y direction) in FIG. 11 are stored in the image memory 2 under the above-mentioned addressing conditions.

The memory interface 27 receives the pixel data and the address data transmitted by the DDA 24, and buffers these received data by the data buffer 30 and the address buffer 29. Being different from this, the address pre-reading circuit 28 buffers the row address to be accessed in the future by a row address buffer disposed internally, and further monitors the buffered row addresses in order to predict the accessed order, the accessed bank, and the accessed row address.

Figure 12:
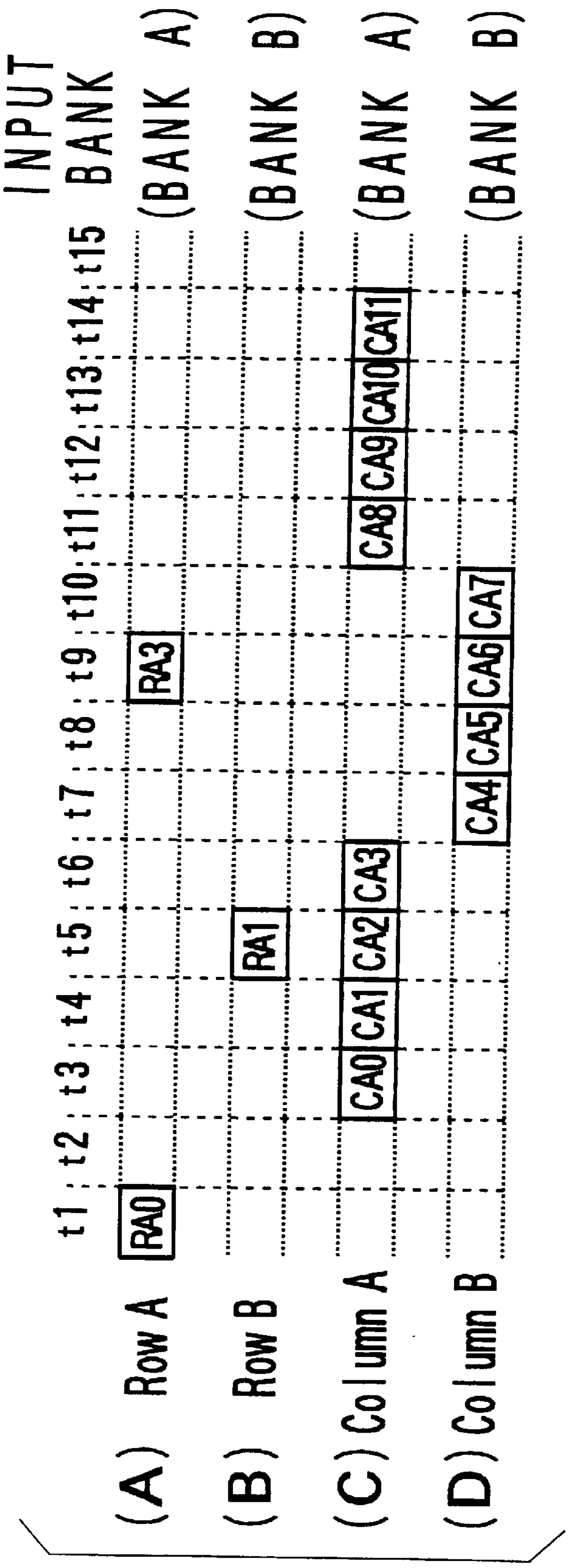
FIG. 12 is a timing chart showing an example, in which the continuous access is made in the first embodiment.

FIG. 12 is a timing chart showing an example of the access timing of the two banks A and B of the image memory 2. In more detail, in FIG. 12, the timing of the row address A to the bank A is shown by (A); the timing of the row address B to the bank B is shown by (B); the timing of the column address A to the bank A is shown by (C); and the timing of the column address B to the bank B is shown by (D).

In the example shown in FIG. 12, the row address RA0 is given at time frame t1; the column address CA0 is given at time frame t3; the column address CA1 is given at time frame t4; the row address RA1 is given at time frame t5; the column address CA3 is given at time frame t6; the column address CA4 is given at time frame t7; the column address CA5 is given at time frame t8; the row address RA3 is given at time frame t9; the column address CA7 is given at time frame t10; the column address CA8 is given at time frame t11; the column address CA9 is given at time frame t12; the column address CA10 is given at time frame t13; and the column address CA11 is given at time frame t14, respectively.

In other words, as shown at time frames t5 and t9, since the row system address and column system address can be inputted to one macro cell 9 through the two different systems, when the column address is being inputted to one of the two banks, it is possible to previously read the access to the succeeding bank on the basis of the data obtained by the address pre-reading circuit 28 and further to activate the row address on the basis of the read access, so that the actual access speed can be increased. In other words, since the row address can be previously activated, it is possible to eliminate or to reduce the page-break penalty generated when the access page is switched. In addition, since the input of the column system is not interrupted during the row activation operation, it is possible to secure the continuous access between any columns of the same page. This indicates that the continuous access can be executed even when the memory is constructed in any of the four scanning directions (upward, downward, leftward, and rightward).

Successively, the column division will be considered.

Figure 13:
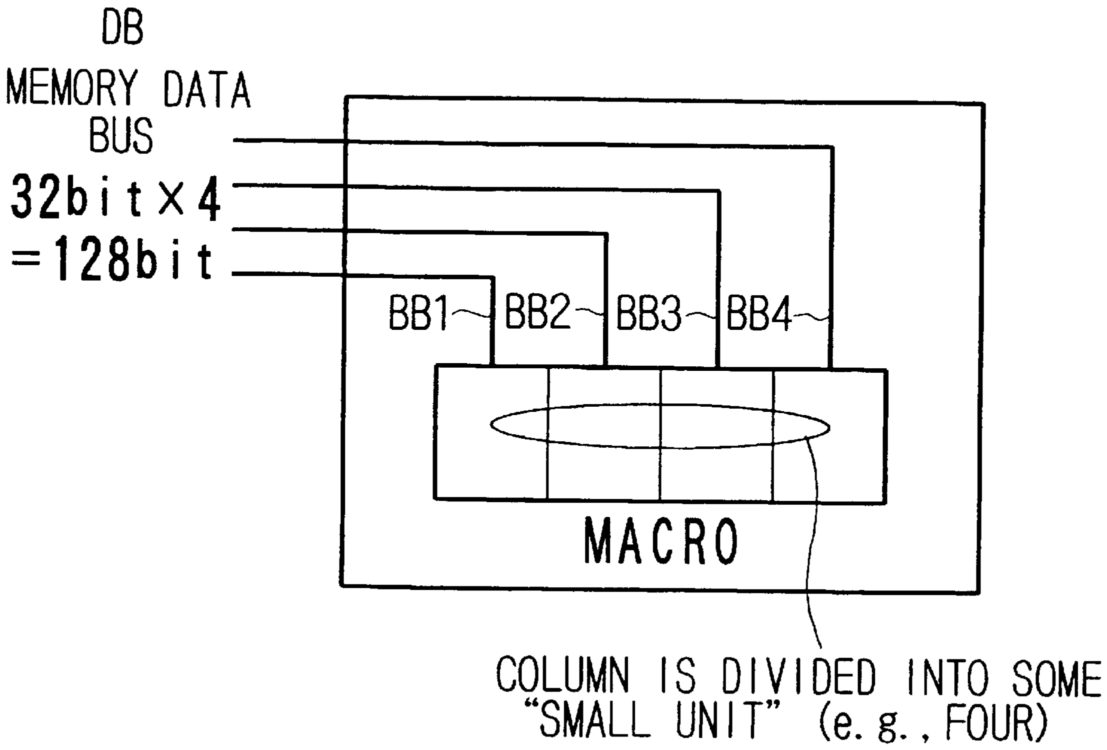
FIG. 13 is an illustration for assistance in explaining a small unit construction in the first embodiment.

Here, the case will be taken into account where the image memory 2 is used in such a way that the column is divided into a plurality of small units and further the divided small unit can be accessed independently from the column, in addition to the conditions required for the continuous access. Here, as shown by FIG. 13, the assumption is made that each column is divided into four small units. In this case, each small unit is constructed by 32bits. Therefore, data for two pixels can be stored in each small unit. The data bus of the image memory 2 is divided into the number of the column divisions (i.e., the same number as that of the small units in each column), so that each bus block corresponds to the small unit in one-to-one correspondence for each column, as the small unit data bus. In this example, the 128-bit data bus of the image memory 2 is divided into four blocks each having 32 bits which corresponds to each small unit.

When the image memory 2 as described above is used, the memory interface 27 is controlled in such a way that the data received by the DDA 24 are buffered and further that when data for four small units have been obtained, the obtained data are packed and then transmitted to the image memory 2. In this case, as far as the corresponding data buses (i.e. the bus blocks) are different from each other, even if the belonging columns are different from each other, no problem arises.

Figure 14:
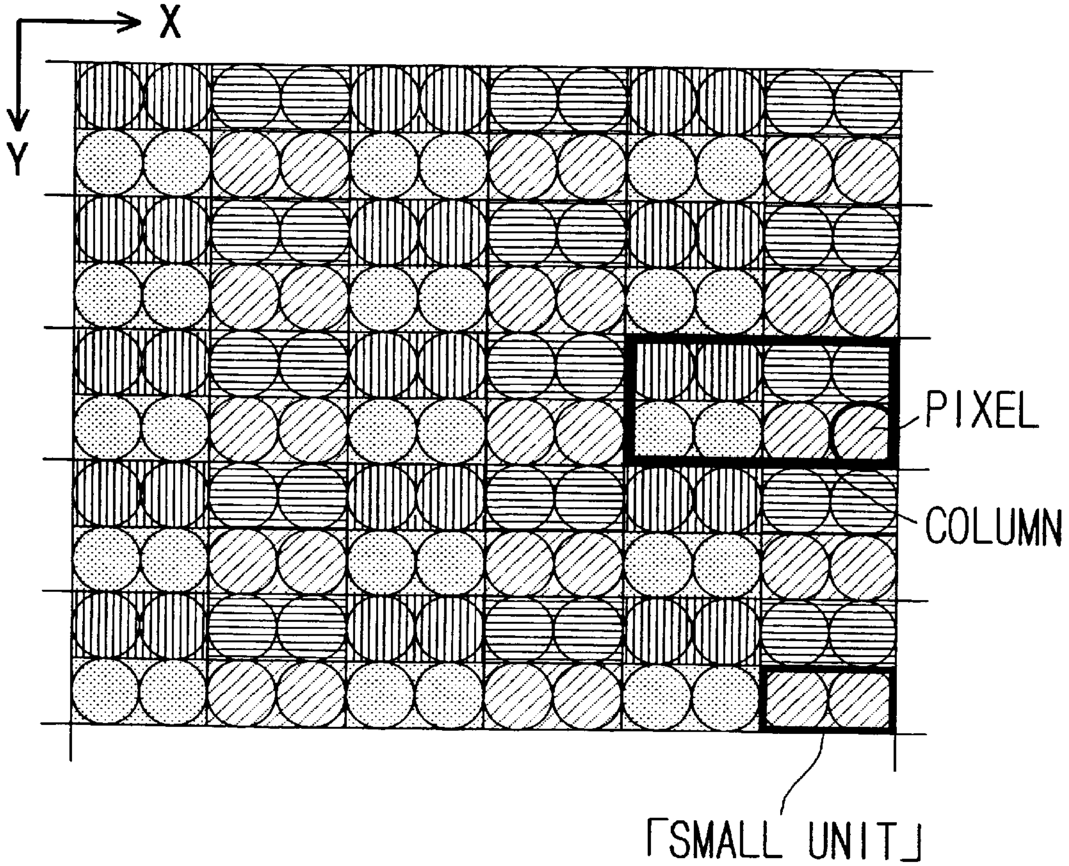
FIG. 14 is an illustration for assistance in explaining the addressing of the columns and the small-units in the first embodiment.

FIG. 14 shows an example of the addressing to the image memory 2 as described above. In FIG. 14, the pixels are shown by four sorts, that is, painted by vertical hatch, horizontal hatch, oblique hatch, and mesh point. In this case, the small unit is formed by a pair of pixels shown by the same pattern. Further, one column is formed by collecting four small units of different patterns.

Figure 15:
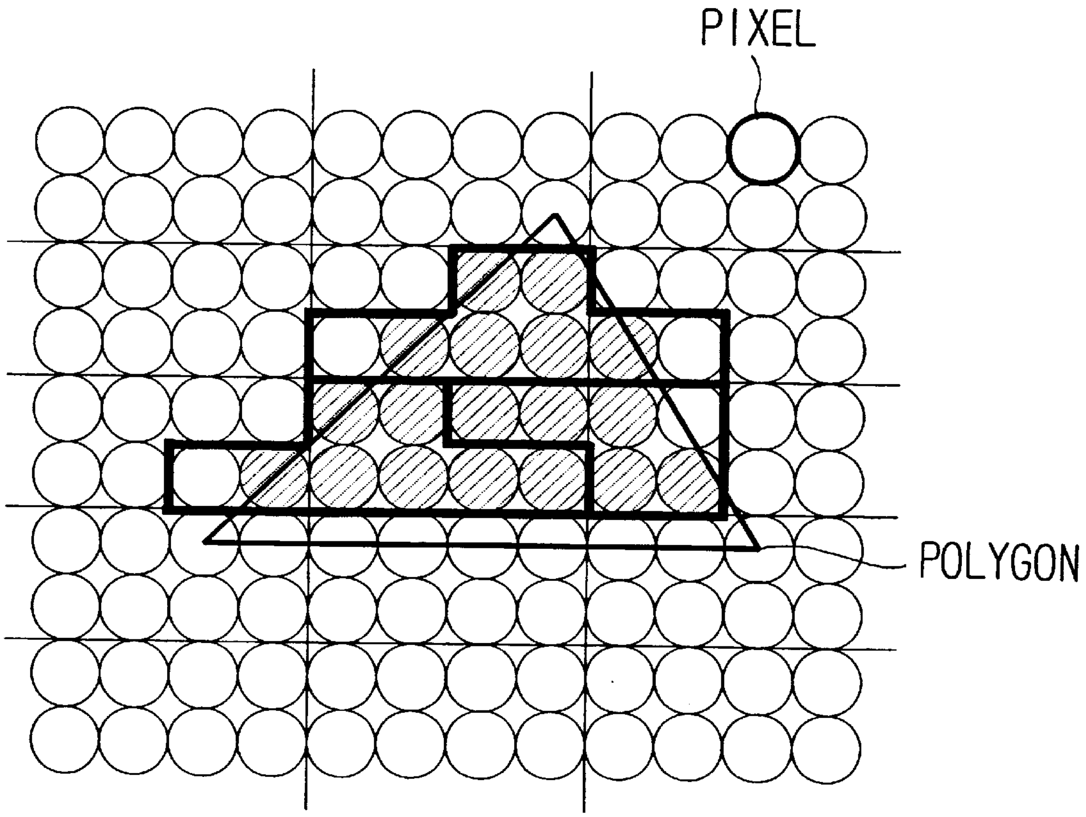
FIG. 15 is an illustration for assistance in explaining an example of polygon data packing in the first embodiment.

FIG. 15 shows an example of packing of the actual polygon data on a screen addressed as shown in FIG. 14. In FIG. 15, in the case of a polygon shown by a fine-line triangle, a convex region enclosed by thick lines is accessed once.

As described above, since the small units are provided, it is possible to freely change the region to be accessed once into any shapes (e.g., a convex shape), so that it is possible to eliminate a wasteful access to a polygon. In other words, since the wasteful access can be reduced, the effective data transfer density can be increased, so that the data transfer speed can be increased without widening the bus width.

Further, in the case where a plurality of macro cells are used, the image memory 2 is controlled by the memory interface 27 in such a way that the data stored in the column rectangular regions adjoining on the screen can be basically stored in the different macro cells, so that it is possible to use a plurality of macro cells effectively.

2nd Embodiment

Figure 16:
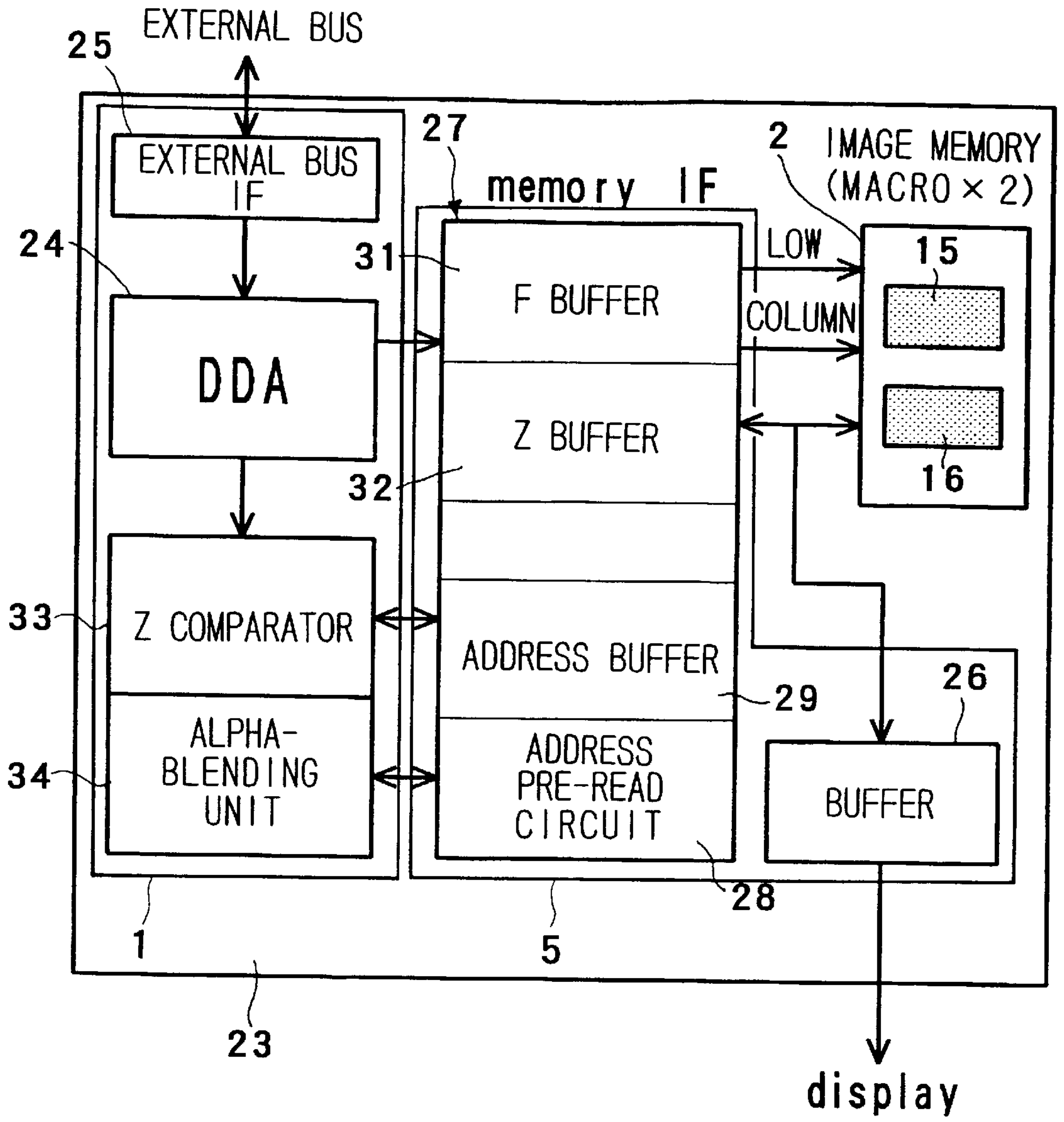
FIG. 16 is a detailed block diagram showing the second embodiment of the image processing LSI according to the present invention.

FIG. 16 is a detailed block diagram showing the second embodiment of the image processing apparatus.

In FIG. 16, the image processing apparatus 23 further comprises a blending unit 34 for executing an alpha blending and a Z comparator 33 for executing Z comparison. Therefore, when a part or all of the two or more polygons are overlapped with each other, it is possible to execute the alpha blending (the colors are blended with each other at the overlapped pixel) and the Z buffering (the depth values are compared with each other to describe only the polygon positioned only on this side). Therefore, the address pre-reading circuit 28 is additionally provided with a frame buffer (F buffer) 31 and a Z buffer 32. Further, the image memory 2 has two macro cells 15 and 16. In corresponding to this, the address pre-reading circuit 28 has two row address buffers for each macro cell, respectively. Further, the memory interface 27 and the buffer 26 have the functions corresponding to the DRAM controller 5 shown in FIG. 1. Further, the DDA 24, the external bus interface 25, the Z comparator 33, and the blending unit 34 correspond to the pixel forming unit 1 shown in FIG. 1.

Here, as the construction of the image memory 2, the following conditions can be considered:

Memory data bus width: 256 bits (Separated I/O)

Number of macro cells: 2

Number of banks: 2 (per one macro)

(each bank comprises a plurality of pages, the number of which is determined according to application)

Page size: 32 columns

Column size: 256 bits

Number of pixel bits (frame) 32 bit/pixel

Number of pixel bits (Z) 32 bit/pixel

Synchronous interface Yes

Here, the frame data for each pixel are 32 bits in total composed of each eight bits of R(red), G(green) and B(blue) and eight bits of the alpha value indicative of transparency.

When the image memory 2 is constructed as described above, eight pixel data can be stored for each column in both the frame data and the Z value data, respectively. Therefore, the screen can be divided into the rectangular regions for each 4×2 pixels, and the two columns can be allocated to the divided region as for the frame data and the Z value data. In this case, however, two columns must belong to two different macro cells 15 and 16, respectively.

In other words, when the screen is divided into 32 pixels in the horizontal direction and 8 pixels in the vertical direction, the frame data and the Z value data of this divided region correspond to the data corresponding to one page of the image memory 2, respectively. The frame data and the Z value data of this divided region are stored in two different macro cells 15 and 16, respectively. Further, data of the adjoining rectangular regions are stored in the different banks or the different macro cells.

On the other hand, the frame data and the Z value data are both stored in both the macro cells 15 and 16 uniformly.

Figure 17A:
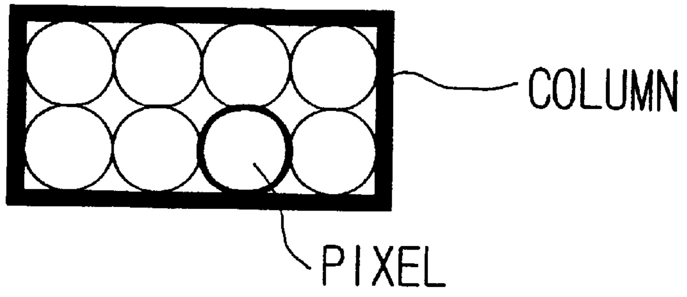
FIGS. 17(A) and 17(B) are is illustrations for assistance in explaining the correspondence of the page and the column to the rectangular regions in the second embodiments.
Figure 17B:
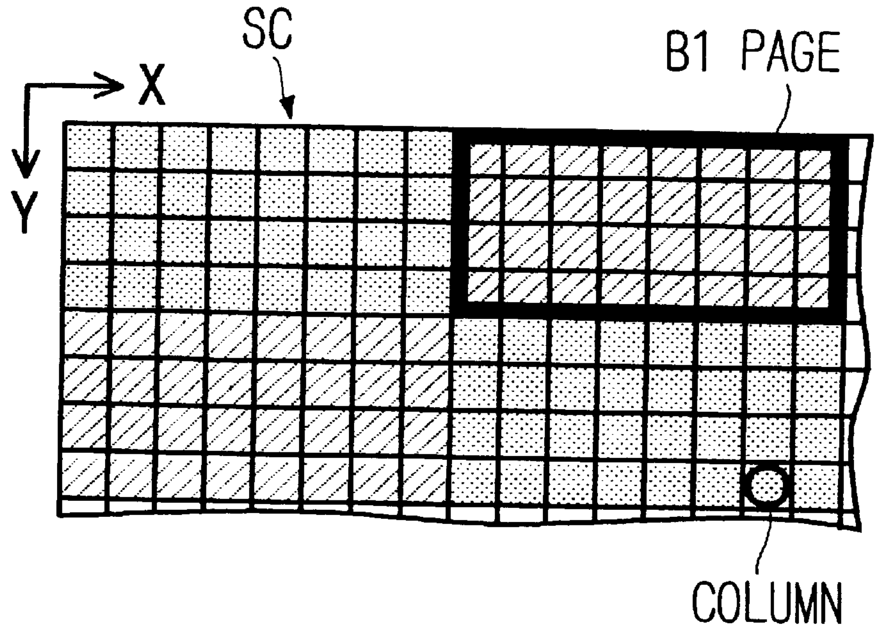

When addressed under the above-mentioned conditions, the page is allocated to the screen as shown in FIGS. 6(A) and 6(B), and the column is allocated as shown in FIGS. 17(A) and 17(B). Here, FIG. 17(A) shows the pixel arrangement in the column, and FIG. 17(B) shows the column arrangement to the page. Owing to the above-mentioned addressing, the memory capacity of each of the two macro cells 15 and 16 can be used uniformly. Therefore, when the number of bits required for each pixel is different in the frame and the Z value, it is possible to use the memory capacity effectively.

Further, since the address inputs to the macro cells 15 and 16 by the row system and the column system are separated into two systems, any column in the page can be accessed continuously, without depending upon the input of the row system.

The address pre-reading circuit 28 monitors the row address to be accessed in the future on the basis of the row address data queued by the row address buffer internally provided and, when a change of the bank to be accessed in the same macro cell is predicted, activates the bank to be accessed next previously while accessing the present bank. By doing this, it is possible to reduce or to eliminate the overhead generated when the page to be accessed changes.

The above-mentioned addressing and the image memory 2 are effective in particular when the data are accessed continuously in the horizontal direction and the vertical direction on the screen. In this case, the continuous access can be made, irrespective of the access direction, as compared with when the row system and the column system are of one system.

Here, the alternate access of the frame data and the Z value data will be considered. In this case, the data bus between the image memory 2 and the memory interface 27 is set to 256 bits.

Now, the alpha blending and the Z buffering processing are executed, on conditions that a part or all of the two polygons are overlapped with each other, that the data of these polygons are formed by the DDA 24 in sequence, and that the formed data are transmitted to the image memory 2. Both the processings executed for the overlapped portions will be explained hereinbelow.

The processing cycle thereof is as follows:

The polygon pixel data first stored in the image memory 2 are read by the blending unit 34 and the Z comparator 33. Further, the polygon data newly transmitted from the DDA 24 are processed together with the read data for each pixel. The obtained results are written in the original positions of the image memory 2.

When the frame data and the Z value data are accessed alternately for the afore-mentioned alpha blending and Z buffering, the method of accessing the image memory 2 is a repetitive cycle of the frame real, the Z value read, the frame write, and the Z value write, for instance.

Figure 18:
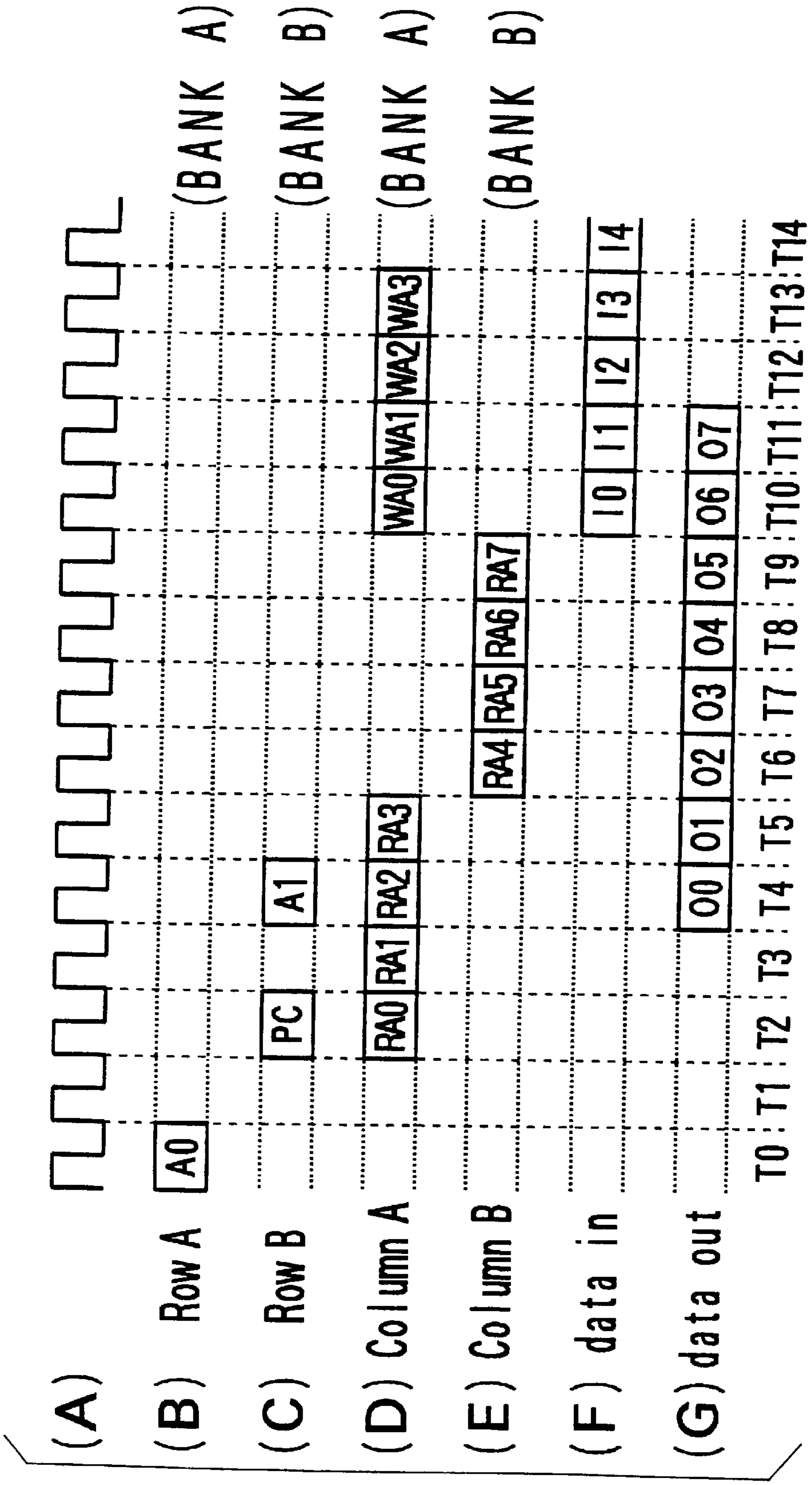
FIG. 18 is a timing chart showing an example, in which alpha blending and Z buffering are made.

FIG. 18 is a timing chart obtained when this cycle is executed. In FIG. 18, (A) shows the timing of the basic clock; (B) shows the timing of the row address A to the bank A in which the timing of an address A0 is shown; (C) shows the timing of the row address B to the bank B in which the timings of a precharge PC and an address A1 are shown; (D) shows the timing of the column address A to the band A, in which the timings of the reading column activations RA0, RA1, RA2 and RA3 and the timings of the writing column activations WA0, WA1, WA2 and WA3 are shown; (E) shows the timing of the column address B to the band B, in which the timings of the reading column activations RA4, RA5, RA6 and RA7 are shown; (F) shows the timings of the data inputs 10, 11, 12, 13 and 14; and (G) shows the timings of the data outputs 00, 01, 02, 03 and 04, respectively.

As understood by FIGS. 6(A) and 6(B), since the frame data and the Z value data corresponding to the same pixel are stored in the different macro cells, in the access cycle of the image memory 2, a pair of the macro cells are accessed alternately by using in common the data bus between the image memory 2 and the memory interface 27.

In other words, after the row of the bank A is activated by the address A0 at timing T0, the reading of the bank A can be executed. Further, at timing T2, the address RA0 of the column A of the bank A is added and then outputted at timing T4 two clocks after timing T2. This delay time depends upon the memory performance. As described above, when the bank A is being read, the address A1 for activating the row of the bank B is added at timing T4, so that the row of the bank B is activated. When the reading of the bank A ends, at timing T6 the address RA4 for reading data from the bank B is added. The read output 04 corresponding to this address RA4 is outputted at timing T8. Further, in the writing operation, after the blending and Z value processing have been executed for the pre-read data 00, when the column address WA0 of the bank A is added at timing T10, the processed results are immediately written as the data I0. Further, the input/output of data bus are separated from each other.

Further, after the read step, when the alpha blending processing and the Z buffering processing are executed, although the memory access is interrupted momentarily, it is possible to execute the continuous access in a series of cycles, by executing a plurality of accesses in each step, by executing the alpha blending processing and the Z buffering processing beginning from the read pixel data in sequence in parallel to the reading of the succeeding pixel data, and by executing the previous row activation.

By the way, there exists the case where the original data are not at all changed, even after the alpha blending processing and the Z buffering processing have been executed. For instance, when the Z value data read from the image memory 2 are decided as being positioned on this side on the screen, in comparison with the Z value data newly transmitted by the Z comparator 33, and further when the polygon pixels read from the image memory 2 are perfectly transparent, the blending of the frame data is not at all necessary, so that the data will not change. Therefore, when all the pixel data processed in the above-mentioned one cycle of the memory access do not change, the memory interface 27 cancels the Z write step, and executes the step of reading the pixel frame data in the succeeding cycle. Therefore, it is possible to reduce the number of accesses to the image memory 2 and thereby to improve the access speed.

Further, the case where only the Z buffering processing is executed will be explained hereinbelow.

In this case, the frame read is not necessary in the four steps of the frame read, the Z read, the frame write and the Z write. Therefore, in this case, the memory interface 27 executes the memory access to the image memory 2, in a repetitive cycle of the Z read, the frame write and the Z write. Further, as the result of the Z buffering, when the data replacement is decided as being unnecessary for all the pixels, the step of the Z write is skipped. That is, after the cycle has been completed by the two steps of the Z read and the frame write, the Z value reading of the succeeding pixel is executed.

Further, the case where the simultaneous access of the frame data and the Z value data will be considered.

The above-mentioned simultaneous access can be executed by accessing the macro cells for storing the frame data and the Z value data corresponding to the pixel at the same time, when the blending processing and the Z buffering processing are executed for the overlapped polygons. In this case, since the two macro cells are accessed by the one data bus, when the data bus of each macro cell is set to 128 bits, the data bus between the image memory 2 and the memory interface 27 can be set to 256 bits. In this case, since the addresses of the frame data and the Z value data are stored in parallel to each other in the address buffer 29, it is possible to transmit the two addresses to a pair of the macro cells at the same time in access operation, so that both the data can be accessed simultaneously by the same data bus.

In the above description, the accessing method to the image memory 2 has been described of the case where the frame data and the Z value data are accessed alternately or simultaneously. In the accessing method, it is possible to increase the operating efficiency of the image memory 2 and thereby to realize a high speed access, by reducing the number of accesses to the image memory 2 according to the various situations.

As described above, since the image processing apparatus according to the present invention is so constructed that the image memory can be used effectively, since the effective data transfer speed can be improved, and since the overhead can be reduced, there exists such an effect that the three-dimensional graphic system of high speed processing can be realized at a relatively low cost.

What is claimed is:

1. An image processing apparatus, comprising:

data forming means (1) for forming frame data for each pixel:

an image memory (2) to which row addresses and column addresses can be both inputted through different address input systems, respectively in parallel to each other, said image memory having at least one macro cell (9) composed of a plurality of banks and serving as one memory device unit for writing and reading data for itself; and control means (5) for dividing a screen (SC) on which the formed frame data are displayed into a plurality of first rectangular regions (A1) each composed of a plurality of pixels, each first rectangular region being set to such a size that all the frame data at pixels therein can be accommodated in one page of the image memory and further that the frame data of a pair of the adjoining first rectangular regions correspond to two different banks in the macro cell, respectively, said control means inputting row addresses and column addresses to the one macro cell at the same time by generating the column addresses continuously, while accessing to a bank, to enable continuous access to any predetermined addresses in the same page of the image memory, and further by previously activating the row addresses in the bank accessed thereafter so that the bank can be accessed immediately even when the accessed bank is switched from one bank to the other bank, wherein;

the screen (SC) is divided into a plurality of the first rectangular regions (A1);

each of the first rectangular regions (A1) is further divided into a plurality of second rectangular regions (A2); and each of the second rectangular regions (A2) is composed of a predetermined number (Q) of pixels, wherein said image memory (2) is composed as follows:

the number of columns of one page is M columns;

the number of bits of one column is N bits;

the number of all the bits of one page is L (=M×N) bits; and the frame data displayed at each pixel of the screen (SC) is P bits per pixel, the screen (SC) being divided into a plurality of the first rectangular regions (A1), each of the first rectangular regions (A1) being divided into M units of the second rectangular regions (A2), and each of the second rectangular regions (A2) being composed of Q units of pixels, where Q is N/p.

2. The image processing apparatus of claim 1, wherein:

each column is divided into R units of small unit columns (A3') each composed of S bits, where R is N/S; and a data bus (DB) of said image memory (2) is divided into R units of bus blocks (BB1 to BB4) in such a way that each of the bus blocks ($BB_i$) corresponds to each of the small unit columns (A3') and thereby each of the small unit columns can be accessed independently at the same time.

3. The image processing apparatus of claim 2, wherein:

each of the second rectangular regions (A2) is divided into R units of small regions (A3) in such a way that each divided small region (A3) corresponds to each small unit column (A3'); and said control means (5) can access to a plurality of the small unit columns (A3') of corresponding different bus blocks at the same time, irrespective of the small unit columns (A3') belonging to the same column or the different columns.

4. A processing apparatus, comprising:

data forming means (1) for forming frame data for each pixel;

an image memory (2) to which row addresses and column addresses can be both inputted through different address input systems, respectively in parallel to each other, said image memory having at least one macro cell (9) composed of a plurality of banks and serving as one memory device unit for writing and reading data for itself; and control means (5) for dividing a screen (SC) on which the formed frame data are displayed into a plurality of first rectangular regions (A1) each composed of a plurality of pixels, each first rectangular region being set to such a size that all the frame data at pixels therein can be accommodated in one page of the image memory and further that the frame data of a pair of the adjoining first rectangular regions correspond to two different banks in the macro cell, respectively, said control means inputting row addresses and column addresses to the one macro cell at the same time by generating the column addresses continuously, while accessing to a bank, to enable continuous access to any predetermined addresses in the same page of the image memory, and further by previously activating the row addresses in the bank accessed thereafter so that the bank can be accessed immediately even when the accessed bank is switched from one bank to the other bank, wherein:

said image memory (2) has a plurality of the macro cells (9);

the first rectangular regions (A1) on the screen (SC) is further divided into a plurality of second rectangular regions (A2) in one-to-one correspondence to the columns in one page; and the frame data of the two adjoining second rectangular regions (A2) on the screen (SC) are accessed by said control means (5) for each macro cell (9) separately.

5. An image processing apparatus, comprising:

data forming means (1) for forming frame data indicative of color data and Z-value data indicative of depth data for each pixel;

an image memory (2) to which row addresses and column addresses can be both inputted through different address input systems, respectively in parallel to each other, said image memory having a plurality of macro cells (15, 16) each composed of a plurality of banks and each serving as one memory device unit for writing and reading data for itself, the frame data and the Z-value data being both accessed through a common data bus; and control means (5) for dividing a screen (SC) on which the formed frame data and the Z-value data are displayed into a plurality of rectangular regions (B1), each rectangular region (B1) being set in such a way that all the frame data and the Z-value data therein can be accommodated in one page of the image memory (2), the frame data and the Z-value data corresponding to the same rectangular region (B1) on the screen being stored in banks of different macro cells, respectively, the frame data of two adjoining rectangular regions (B1, B1) being stored in the two different banks of the same macro cell or in the two different banks of the two different macro cells, respectively, the Z-value data of two adjoining rectangular regions (B1, B1) being stored in the two different banks of the same macro cell or in the two different banks of the two different macro cells, respectively in such a relationship between the frame data and the Z-value data that the frame data of one rectangular region (B1) and the Z-value data of the other rectangular region (B1) adjoining thereto are stored in the two different banks of the same macro cell or in the two different banks of the two macro cells in such a way that the respective macro cells and the respective banks can be used uniformly.

6. The image processing apparatus of claim 5, wherein said data forming means (1) comprises:

an external bus interface (25) connected to an external circuit;

a digital differential analyzer (24) for forming pixel data on the basis of data transmitted through said external bus interface (25);

a blending unit (34) for executing alpha-blending processing; and a Z comparator (33) for executing Z-buffe ring processing.

7. The image processing apparatus of claim 5, wherein said control means (5) comprises:

an address buffer circuit (29);

a frame buffer circuit (31);

a Z buffer circuit (32); and an address pre-read circuit (28) for buf ering row addresses to be accessed in the future.

8. The image processing apparatus of claim 5, wherein:

each of a plurality of the macro cells is composed of a plurality of banks (17, 18; 19, 20); and the data stored in the same macro cell (15 or 16) among the frame data and the Z-value data in the two adjoining rectangular regions (B(, B2) adjoining on the screen (SC) are stored in the different banks of the same macro cell.

9. The image processing apparatus of claim 5, wherein when said control means accesses the banks (17 to 20), the column addresses are inputted continuously so that any addresses in the same p age can be accessed continuously, and further the rows of the bank to be next accessed are activated in parallel to the input of the column addresses so that the switched bank can be accessed continuously.

10. The image processing apparatus of claim 9, wherein said control means (5) can access the frame data and the Z-value data corresponding to the same pixel for each macro cell (15, 16) separately through one data bus alternately.

11. The image processing apparatus of claim 9, wherein said control means (5) accesses the frame data and the Z-value data corresponding to the same pixel at the same time for each macro cell (15, 16) separately, to write and read the frame data and the Z-value data in and from each of the different macro cells at the same time.

* * * * *